United States Patent
Marra, III et al.

(10) Patent No.: US 6,650,077 B1
(45) Date of Patent: Nov. 18, 2003

(54) METHOD FOR CONTROLLING PRINTER PAPER FEED

(75) Inventors: Michael Anthony Marra, III, Lexington, KY (US); Barry Baxter Stout, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 22 days.

(21) Appl. No.: 09/892,717

(22) Filed: Jun. 27, 2001

(51) Int. Cl.[7] .............................................. G05B 11/01
(52) U.S. Cl. ......................... 318/560; 400/74; 400/582
(58) Field of Search ........................... 318/560; 400/74, 400/582; 347/16

(56) References Cited

U.S. PATENT DOCUMENTS

| | | | |
|---|---|---|---|
| 4,574,291 A | 3/1986 | Wimmer | |
| 4,686,540 A | 8/1987 | Leslie et al. | |
| 4,739,346 A | 4/1988 | Buckley | |
| 5,241,525 A | 8/1993 | Taylor | |
| 5,349,905 A | 9/1994 | Taylor et al. | |
| 5,351,068 A | 9/1994 | Moon et al. | |
| 5,598,201 A | 1/1997 | Stodder et al. | |
| 5,625,269 A | 4/1997 | Ikeda | |
| 5,701,145 A | 12/1997 | Ninomiya | |
| 5,740,728 A | 4/1998 | DeBarber et al. | |
| 5,751,303 A | 5/1998 | Erickson et al. | |
| 5,828,387 A | 10/1998 | Wataya et al. | |
| 5,940,105 A | 8/1999 | Hayami | |
| 6,017,114 A | 1/2000 | Elgee et al. | |
| 6,042,228 A | 3/2000 | Yamada et al. | |
| 6,053,648 A | 4/2000 | Mistyurik | |
| 6,065,830 A | 5/2000 | Hiramatsu et al. | |
| 6,068,362 A | 5/2000 | Dunand et al. | |
| 6,074,054 A | 6/2000 | Katsuyama | |
| 6,155,680 A | 12/2000 | Belon et al. | |
| 6,179,419 B1 | 1/2001 | Rasmussen et al. | |
| 6,213,659 B1 | 4/2001 | Elgee | |
| 6,227,534 B1 * | 5/2001 | Schoedinger et al. | 271/110 |
| 6,305,857 B1 * | 10/2001 | Crowley et al. | 226/31 |
| 6,364,549 B1 * | 4/2002 | Lesniak et al. | 400/582 |

* cited by examiner

Primary Examiner—Jeffrey Donels
(74) Attorney, Agent, or Firm—Thompson Hine, LLP

(57) ABSTRACT

A method for rotating a printer paper-feed roller toward a desired rotational position wherein the printer paper-feed roller is driven by a motor. One step includes controlling the motor with a signal which at least includes the product of a scale factor and a function of an error signal, wherein the error signal represents the difference between the actual rotational position and the desired rotational position of the printer paper-feed roller. Another step includes varying the scale factor in a predetermined manner over time when a predetermined condition has been met. In one example, the scale factor is decreased in a linear manner over time when the predetermined condition has been met. In one implementation, the predetermined condition is a predetermined rotational distance of the printer paper-feed roller from the desired rotational position.

28 Claims, 2 Drawing Sheets

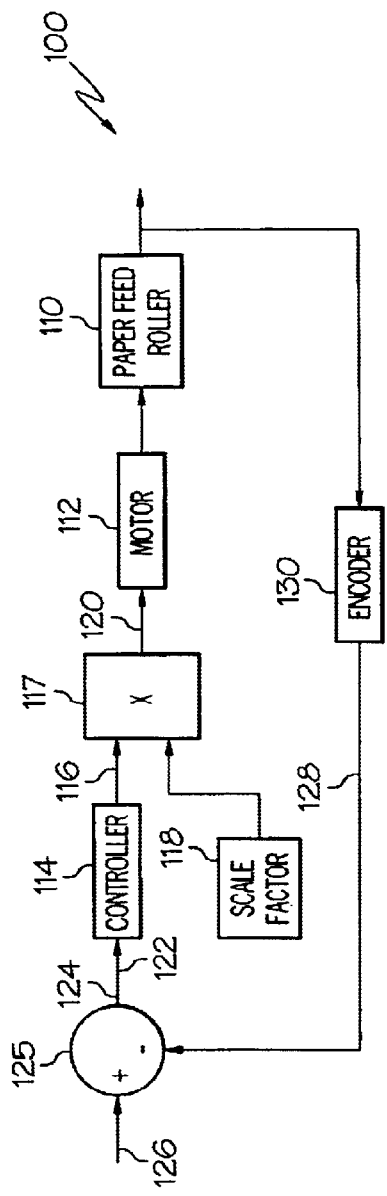
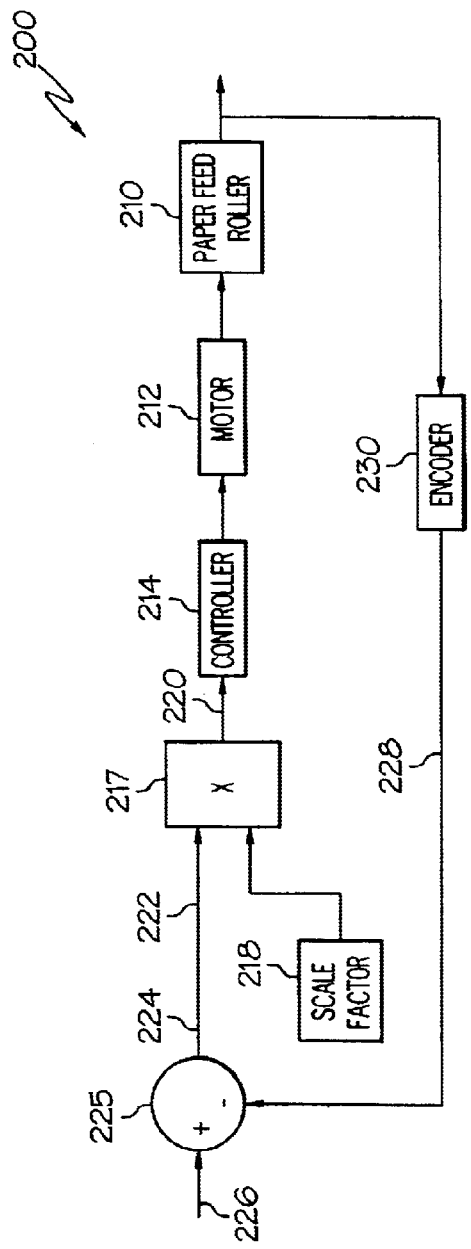

METHOD FOR CONTROLLING PRINTER PAPER FEED

TECHNICAL FIELD

The present invention relates generally to printers, and more particularly to a method for controlling the paper feed of a printer.

BACKGROUND OF THE INVENTION

Printers include those printers having a paper-feed roller which rotates to a desired rotational position to advance a paper sheet, such as to advance a paper sheet between print swaths printed by a print head mounted on a carrier system. In a known design, a DC (direct current) motor is used to drive the paper-feed roller. An output signal from a paper-feed controller, such as a proportional or a PI (proportional integral) or a PID (proportional integral derivative) controller, is used to control the motor. Typically, the controller is used in a feedback control system wherein an encoder measures the rotational position of the paper-feed roller and wherein the error signal between the actual rotational position (measured by the encoder) and the desired rotational position is used as the input to the controller. In one known mode of operation, once the paper-feed roller reaches the desired rotational position, the controller shuts the motor off. However, in this one mode, the quick release of the trapped energy in the gear train and the motor tends to displace the paper-feed roller away from its desired position. In another known mode of operation, the controller remains active. However, in this other mode, vibrations induced by the carrier system may be amplified by the paper-feed controller.

What is needed is an improved method for rotating a printer paper-feed roller.

SUMMARY OF THE INVENTION

A broadly-described expression of a method of the invention is for rotating a printer paper-feed roller toward a desired rotational position wherein the printer paper-feed roller is driven by a motor. The broadly-described expression of a method of the invention includes steps a) and b). Step a) includes controlling the motor with a signal which at least includes the product of a scale factor and a function of an error signal, wherein the error signal represents the difference between the actual rotational position and the desired rotational position of the printer paper-feed roller. Step b) includes varying the scale factor in a predetermined manner over time when a predetermined condition has been met. In one example, the scale factor is decreased in a linear manner over time when the predetermined condition has been met. In one implementation, the predetermined condition is a predetermined rotational distance of the printer paper-feed roller from the desired rotational position. In another implementation, the predetermined condition is a predetermined time which includes the expected time to rotate the printer paper-feed roller to the desired rotational position.

Several benefits and advantages are derived from the broadly-described expression of a method of the invention. In one example, decreasing the scale factor over time gradually releases the trapped energy in the gear train and the motor thereby avoiding the prior art problem of displacing the paper-feed roller away from its desired position when the motor is abruptly shut off. Decreasing the scale factor over time also avoids the prior art problem of the paper-feed controller amplifying vibrations induced by the carrier system when the controller remains active.

BRIEF DESCRIPTION OF THE DRAWINGS

FIG. 1 is a block diagram of an embodiment of apparatus for performing a first method of the invention wherein the scale factor is applied to the output of a controller;

FIG. 2 is a block diagram of an embodiment of apparatus for performing a second method of the invention wherein the scale factor is applied to the input of a controller.

DETAILED DESCRIPTION

Figure 3:
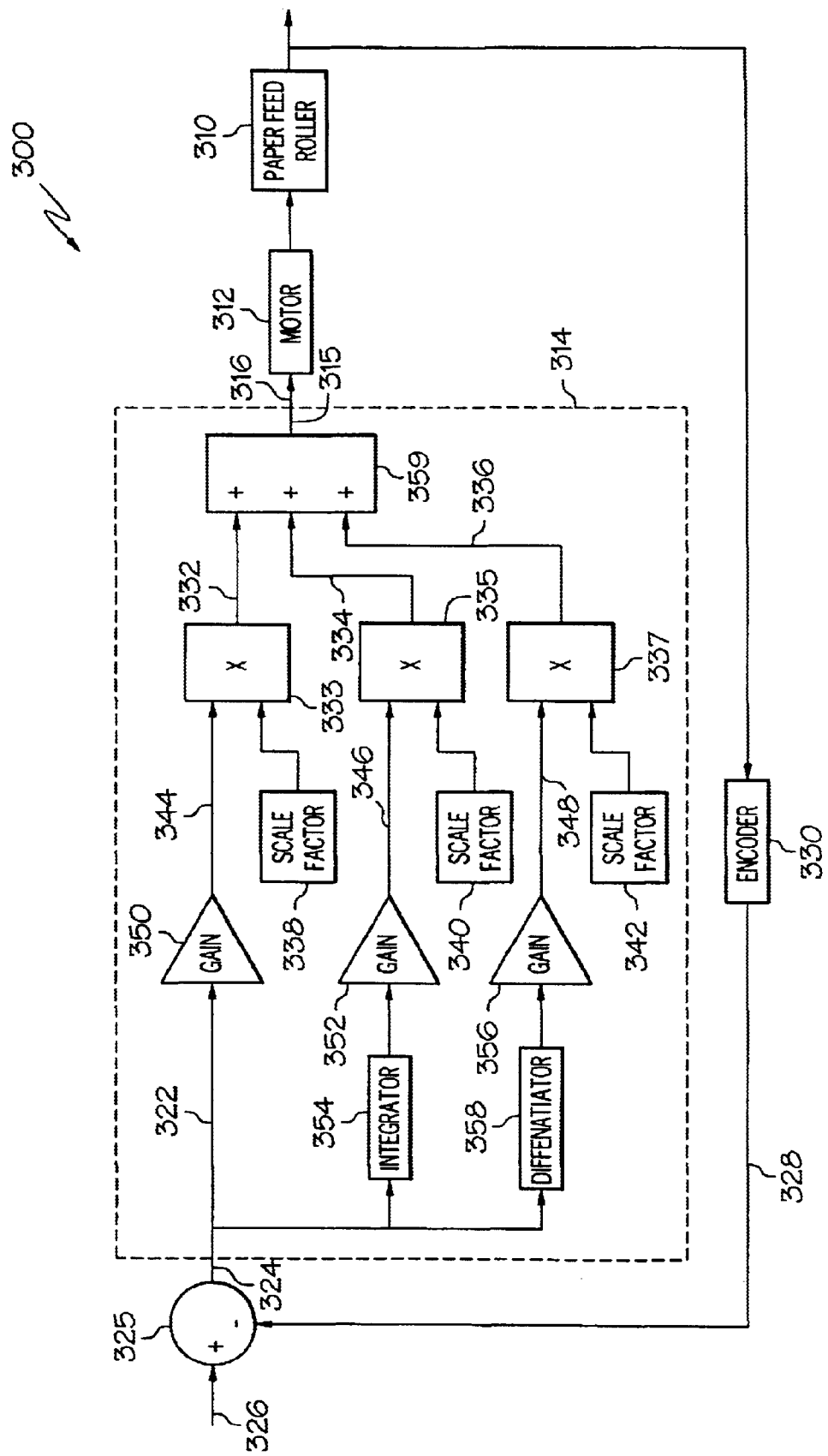
FIG. 3 is a block diagram of an embodiment of apparatus for performing a third method of the invention wherein the scale factor is applied to a parameter of a controller.

FIG. 1 illustrates an embodiment of apparatus 100 for performing a first method of the invention. The first method of the invention is for rotating a printer paper-feed roller 110 toward a desired rotational position 126 wherein the printer paper-feed roller 110 is driven by a motor 112 (such as a DC motor) and wherein the motor 112 is controlled by a controller 114. The first method comprises steps a) through c). Step a) includes multiplying (by, for example, a multiplier 117) the output signal 116 of the controller 114 by a scale factor 118. Step b) includes applying the multiplied output signal 120 to the motor 112 to drive the printer paper-feed roller 110. Step c) includes decreasing the scale factor 118 in a predetermined manner over time when a predetermined condition has been met. By "decreasing the scale factor in a predetermined manner over time" is meant that the scale factor is not switched from an initial value to a final value at an instant of time but that the scale factor is decreased from an initial value to a final value over a period of time. In one example, the period of time is between generally one-half second and one second. In one construction, the scale factor is decreased using ramp-down logic.

In one implementation of the first method, the predetermined condition is a predetermined rotational distance (e.g., 50 microns) of the printer paper-feed roller 110 from the desired rotational position 126. In another implementation of the first method, the predetermined condition is a predetermined time (e.g., 100 milliseconds) which includes the expected time to rotate the printer paper-feed roller 110 to the desired rotational position 126.

In one example of the first method, the controller receives an input signal 122 representing an error signal 124 which is equal to the difference (such as from a subtractor 125) between the actual rotational position 128 (measured, for example, by an encoder 130) and the desired rotational position 126 of the printer paper-feed roller 110.

In one execution of the first method, step c) linearly decreases the scale factor over time. In the same or a different execution of the first method, the initial value of the scale factor in step c) is unity. In the same or a different execution of the first method, the final value of the scale factor in step c) is zero. In another execution of the first method, the final value of the scale factor is ten to twenty percent of its initial value.

FIG. 2 illustrates an embodiment of apparatus 200 for performing a second method of the invention. The second method of the invention is for rotating a printer paper-feed roller 210 toward a desired rotational position 226 wherein the printer paper-feed roller 210 is driven by a motor 212 (such as a DC motor) and wherein the motor 212 is controlled by a controller 214. The second method comprises steps a) through d). Step a) includes creating an input signal 222 representing an error signal 224 which is equal to the difference (such as from a subtractor 225) between the actual rotational position 228 (measured, for example, by an encoder 230) and the desired rotational position 226 of the printer paper-feed roller 210. Step b) includes multiplying (by, for example, a multiplier 217) the input signal 222 by a scale factor 218. Step c) includes applying the multiplied input signal 220 to the controller 214 to control the motor 212 to drive the printer paper-feed roller 210. Step d) includes decreasing the scale factor 218 in a predetermined manner over time when a predetermined condition has been met. By "decreasing the scale factor in a predetermined manner over time" is meant that the scale factor is not switched from an initial value to a final value at an instant of time but that the scale factor is decreased from an initial value to a final value over a period of time. In one example, the period of time is between generally one-half second and one second. In one construction, the scale factor is decreased using ramp-down logic.

In one implementation of the second method, the predetermined condition is a predetermined rotational distance (e.g., 50 microns) of the printer paper-feed roller 210 from the desired rotational position 226. In another implementation of the second method, the predetermined condition is a predetermined time (e.g., 100 milliseconds) which includes the expected time to rotate the printer paper-feed roller 210 to the desired rotational position 226.

In one execution of the second method, step d) linearly decreases the scale factor over time. In the same or a different execution of the second method, the initial value of the scale factor in step d) is unity. In the same or a different execution of the second method, the final value of the scale factor in step d) is zero. In another execution of the second method, the final value of the scale factor is ten to twenty percent of its initial value.

FIG. 3 illustrates an embodiment of apparatus 300 for performing a third method of the invention. The third method of the invention is for rotating a printer paper-feed roller 310 toward a desired rotational position 326 wherein the printer paper-feed roller 310 is driven by a motor 312 (such as a DC motor) and wherein the motor 312 is controlled by a controller 314. The controller has an input signal 322 and an output signal 316. The input signal 322 represents an error signal 324 which is equal to the difference (such as from a subtractor 325) between the actual rotational position 328 (measured, for example, by an encoder 330) and the desired rotational position 326 of the printer paper-feed roller 310. The output signal 316 includes the product 332, 334 and 336 (such as from a multiplier 333, 335 and 337) of a scale factor 338, 340 and 342 and a function 344, 346 and 348 of the input signal 322. The third method comprises steps a) and b). Step a) includes applying the output signal 316 to the motor 312 to drive the printer paper-feed roller 310. Step b) includes decreasing the scale factor 338, 340 and 242 in a predetermined manner over time when a predetermined condition has been met. By "decreasing the scale factor in a predetermined manner over time" is meant that the scale factor is not switched from an initial value to a final value at an instant of time but that the scale factor is decreased from an initial value to a final value over a period of time. In one example, the period of time is between generally one-half second and one second. In one construction, the scale factor is decreased using ramp-down logic.

In one implementation of the third method, the predetermined condition is a predetermined rotational distance (e.g., 50 microns) of the printer paper-feed roller 310 from the desired rotational position. In another implementation of the third method, the predetermined condition is a predetermined time (e.g., 100 milliseconds) which includes the expected time to rotate the printer paper-feed roller 310 to the desired rotational position 326.

In one execution of the third method, step b) linearly decreases the scale factor over time. In the same or a different execution of the third method, the initial value of the scale factor in step b) is unity. In the same or a different execution of the third method, the final value of the scale factor in step b) is zero. In another execution of the third method, the final value of the scale factor is ten to twenty percent of its initial value.

In a first example of the third method, the function 344 is proportional (through a gain 350 which can be unity or any other value) to the input signal 322. In a second example of the third method, the function 346 is proportional (through a gain 352 which can be unity or any other value) to the time integral (through an integrator 354) of the input signal 322. In a third example of the third method, the function 348 is proportional (through a gain 356 which can be unity or any other value) to the time derivative (through a differentiator 358) of the input signal 322. In other examples of controllers for the third method, before applying the scale factor, only gain 350 is present (as in a pure proportional controller) or only gains 350 and 352 and integrator 354 are present (as in a PI or proportional integral controller) or gains 350, 352 and 356 and integrator 354 and differentiator 358 are present (as in a PID or proportional integral derivative controller as shown in FIG. 3). It is noted that the output signal 315 in FIG. 3 is the sum (through, for example, an adder 359) of the products 332, 334 and 336. Further examples of applying scale factors to other parameters of other controllers are left to the artisan.

A broadly-described expression of a method of the invention, which the previously-described first, second and third methods are examples thereof, is for rotating a printer paper-feed roller 110, 210 and 310 toward a desired rotational position wherein the printer paper-feed roller is driven by a motor 112, 212 and 312 (such as a DC motor). The broadly-described method comprises steps a) and b). Step a) includes controlling the motor with a signal 116, 216 and 316 which at least includes the product of a scale factor and a function of an error signal 124, 224 and 324, wherein the error signal represents the difference between the actual rotational position 128, 228 and 328 and the desired rotational position 126, 226 and 326 of the printer paper-feed roller. Step b) includes varying the scale factor in a predetermined manner over time when a predetermined condition has been met. By "varying the scale factor in a predetermined manner over time" is meant that the scale factor is not switched from an initial value to a final value at an instant of time but that the scale factor is varied from an initial value to a final value over a period of time. In one example, the period of time is between generally one-half second and one second. In one construction, the scale factor is varied using predetermined control logic.

In one implementation of the broadly-described method, the predetermined condition is a predetermined rotational distance (e.g., 50 microns) of the printer paper-feed roller 110, 210 and 310 from the desired rotational position. In another implementation of the third method, the predetermined condition is a predetermined time (e.g., 100 milliseconds) which includes the expected time to rotate the printer paper-feed roller 110, 210 and 310 to the desired rotational position.

In one execution of the broadly-described method, step b) linearly decreases the scale factor over time. In the same or a different execution of the broadly-described method, the initial value of the scale factor in step b) is unity. In the same or a different execution of the broadly-described method, the final value of the scale factor in step b) is zero. In another execution of the broadly-described method, the final value of the scale factor is ten to twenty percent of its initial value.

The broadly-described expression of a method of the invention and the first, second, and third described methods of the invention rotate the printer paper-feed roller to the desired rotational position unless a new move command interrupts the previous move before the previous move has reached the desired rotational position.

Several benefits and advantages are derived from the broadly-described expression of a method of the invention and from the first, second and third methods of the invention. In one example, decreasing the scale factor over time gradually releases the trapped energy in the gear train and the motor thereby avoiding the prior art problem of displacing the paper-feed roller away from its desired position when the motor is abruptly shut off. Decreasing the scale factor over time also avoids the prior art problem of the paper-feed controller amplifying vibrations induced by the carrier system when the controller remains active.

The foregoing description of several methods of the invention has been presented for purposes of illustration. It is not intended to be exhaustive or to limit the invention to the precise methods disclosed, and obviously many modifications and variations are possible in light of the above teaching. It is intended that the scope of the invention be defined by the claims appended hereto.

What is claimed is:

1. A method for rotating a printer paper-feed roller toward a desired rotational position wherein the printer paper-feed roller is driven by a motor and wherein the method comprises the steps of:
    a) controlling the motor with a signal which at least includes the product of a scale factor and a function of an error signal, wherein the error signal represents the difference between the actual rotational position and the desired rotational position of the printer paper-feed roller; and
    b) varying the scale factor in a predetermined manner over time when a predetermined condition has been met.

2. The method of claim 1, wherein the predetermined condition is a predetermined rotational distance of the printer paper-feed roller from the desired rotational position.

3. The method of claim 1, wherein the predetermined condition is a predetermined time which includes the expected time to rotate the printer paper-feed roller to the desired rotational position.

4. The method of claim 1, wherein step b) linearly decreases the scale factor over time.

5. The method of claim 1, wherein the initial value of the scale factor in step b) is unity.

6. The method of claim 1, wherein the final value of the scale factor in step b) is zero.

7. A method for rotating a printer paper-feed roller toward a desired rotational position wherein the printer paper-feed roller is driven by a motor, wherein the motor is controlled by a controller, wherein the controller has an output signal, and wherein the method comprises the steps of:
    a) multiplying the output signal of the controller by a scale factor;
    b) applying the multiplied output signal to the motor to drive the printer paper-feed roller; and
    c) decreasing the scale factor in a predetermined manner over time when a predetermined condition has been met.

8. The method of claim 7, wherein the predetermined condition is a predetermined rotational distance of the printer paper-feed roller from the desired rotational position.

9. The method of claim 7, wherein the predetermined condition is a predetermined time which includes the expected time to rotate the printer paper-feed roller to the desired rotational position.

10. The method of claim 7, wherein the controller receives an input signal representing an error signal which is equal to the difference between the actual rotational position and the desired rotational position of the printer paper-feed roller.

11. The method of claim 7, wherein step c) linearly decreases the scale factor over time.

12. The method of claim 7, wherein the initial value of the scale factor in step c) is unity.

13. The method of claim 7, wherein the final value of the scale factor in step c) is zero.

14. A method for rotating a printer paper-feed roller toward a desired rotational position wherein the printer paper-feed roller is driven by a motor, wherein the motor is controlled by a controller, and wherein the method comprises the steps of:
    a) creating an input signal representing an error signal which is equal to the difference between the actual rotational position and the desired rotational position of the printer paper-feed roller;
    b) multiplying the input signal by a scale factor;
    c) applying the multiplied input signal to the controller to control the motor to drive the printer paper-feed roller; and
    d) decreasing the scale factor in a predetermined manner over time when a predetermined condition has been met.

15. The method of claim 14, wherein the predetermined condition is a predetermined rotational distance of the printer paper-feed roller from the desired rotational position.

16. The method of claim 14, wherein the predetermined condition is a predetermined time which includes the expected time to rotate the printer paper-feed roller to the desired rotational position.

17. The method of claim 14, wherein step d) linearly decreases the scale factor over time.

18. The method of claim 14, wherein the initial value of the scale factor in step d) is unity.

19. The method of claim 14, wherein the final value of the scale factor in step d) is zero.

20. A method for rotating a printer paper-feed roller toward a desired rotational position wherein the printer paper-feed roller is driven by a motor, wherein the motor is controlled by a controller, wherein the controller has an input signal and an output signal, wherein the input signal represents an error signal which is equal to the difference between the actual rotational position and the desired rotational position of the printer paper-feed roller, wherein the output signal includes the product of a scale factor and a function of the input signal, and wherein the method comprises the steps of:
    a) applying the output signal to the motor to drive the printer paper-feed roller; and
    b) decreasing the scale factor in a predetermined manner over time when a predetermined condition has been met.

21. The method of claim 20, wherein the predetermined condition is a predetermined rotational distance of the printer paper-feed roller from the desired rotational position.

22. The method of claim 20, wherein the predetermined condition is a predetermined time which includes the expected time to rotate the printer paper-feed roller to the desired rotational position.

23. The method of claim 20 wherein step b) linearly decreases the scale factor over time.

24. The method of claim 20, wherein the initial value of the scale factor in step b) is unity.

25. The method of claim 20 wherein the final value of the scale factor in step b) is zero.

26. The method of claim 20, wherein the function is proportional to the input signal.

27. A method for rotating a printer paper-feed roller toward a desired rotational position wherein the printer paper-feed roller is driven by a motor, wherein the motor is controlled by a controller, wherein the controller has an input signal and an output signal, wherein the input signal represents an error signal which is equal to the difference between the actual rotational position and the desired rotational position of the printer paper-feed roller, wherein the output signal includes the product of a scale factor and a function of the input signal, wherein the function is proportional to the time integral of the input signal, and wherein the method comprises the steps of:

a) applying the output signal to the motor to drive the printer paper-feed roller; and b) decreasing the scale factor in a predetermined manner over time when a predetermined condition has been met.

28. A method for rotating a printer paper-feed roller toward a desired rotational position wherein the printer paper-feed roller is driven by a motor, wherein the motor is controlled by a controller, wherein the controller has an input signal and an output signal, wherein the input signal represents an error signal which is equal to the difference between the actual rotational position and the desired rotational position of the printer paper-feed roller, wherein the output signal includes the product of a scale factor and a function of the input signal, wherein the function is proportional to the time derivative of the input signal, and wherein the method comprises the steps of:

a) applying the output signal to the motor to drive the printer paper-feed roller; and b) decreasing the scale factor in a predetermined manner over time when a predetermined condition has been met.

* * * * *